(12) United States Patent
Coady et al.

(10) Patent No.: US 11,599,429 B2
(45) Date of Patent: Mar. 7, 2023

(54) QUANTUM FAILSAFE SERVICE

(71) Applicant: Red Hat, Inc., Raleigh, NC (US)

(72) Inventors: Stephen Coady, Waterford (IE); Leigh Griffin, Waterford (IE)

(73) Assignee: Red Hat, Inc., Raleigh, NC (US)

(*) Notice: Subject to any disclaimer, the term of this patent is extended or adjusted under 35 U.S.C. 154(b) by 68 days.

(21) Appl. No.: 17/215,895

(22) Filed: Mar. 29, 2021

(65) Prior Publication Data

US 2022/0308966 A1    Sep. 29, 2022

(51) Int. Cl.
*G06F 11/14*    (2006.01)
*G06N 10/00*    (2022.01)

(52) U.S. Cl.
CPC ......... *G06F 11/1469* (2013.01); *G06N 10/00* (2019.01); *G06F 2201/84* (2013.01)

(58) Field of Classification Search
CPC ............. G06F 11/1469; G06F 11/3433; G06F 11/3419; G06F 11/3409; G06F 11/3058; G06F 11/1441; G06F 2201/84; G06N 10/00

See application file for complete search history.

(56) References Cited

U.S. PATENT DOCUMENTS

| 8,291,261 | B2 | 10/2012 | Malleck et al. |
| 8,589,733 | B2 | 11/2013 | Di Domenico et al. |
| 10,579,936 | B2 | 3/2020 | Thornton et al. |
| 2012/0148237 | A1* | 6/2012 | Harrison ................ G06N 10/00 398/180 |
| 2018/0157986 | A1 | 6/2018 | Oxford et al. |
| 2020/0310908 | A1 | 10/2020 | Hogaboam |
| 2021/0056003 | A1* | 2/2021 | Stevanovic ......... G06F 11/2035 |

FOREIGN PATENT DOCUMENTS

JP    2006093976 A  *  4/2006

OTHER PUBLICATIONS

Author Unknown, "The Process for Transferring Qubits Between Locations," Stack Exchange Inc., Jul. 2018, 4 pages, available online at https://quantumcomputing.stackexchange.com/questions/3872/the-process-for-transferring-qubits-between-locations.
Iliyasu, Abdullah M., et al., "Hybrid Quantum-Classical Protocol for Storage and Retrieval of Discrete-Valued Information," Entropy, 2014, 16, pp. 3537-3551, available online at https://www.mdpi.com/1099-4300/16/6/3537/htm.

* cited by examiner

*Primary Examiner* — Matthew M Kim
*Assistant Examiner* — Matthew N Putaraksa
(74) *Attorney, Agent, or Firm* — Dority & Manning, P.A.

(57) ABSTRACT

A quantum failsafe service (QFS) is disclosed herein. In one example, a first quantum computing device executes a QFS that receives a system stress indicator from a system monitor that tracks a status of the first quantum computing device and/or a status of qubits maintained by the first quantum computing device. The QFS determines, based on the system stress indicator, that a quantum service backup is to be performed for a quantum service running on the first quantum computing device, and obtains a profile snapshot representing a current state of the quantum service. The QFS service then performs superdense encoding of the profile snapshot using a first set of qubits entangled with a second set of qubits of a second quantum computing device, and the first set of qubits are sent to the second quantum computing device (e.g., for storage in a classical data repository, according to some examples).

20 Claims, 7 Drawing Sheets

QUANTUM FAILSAFE SERVICE

BACKGROUND

Quantum computing involves the use of quantum bits, referred to herein as "qubits," which have characteristics that differ from those of classical (i.e., non-quantum) bits used in classical computing. For example, a pair of qubits may experience a physical phenomenon referred to as "entanglement," in which the quantum state of each qubit cannot be described independently of the state of the other qubit. As quantum computing continues to increase in popularity and become more commonplace, an ability to proactively respond to adverse operating conditions that may jeopardize the availability of a quantum service executing on a quantum computing device will be desirable.

SUMMARY

The examples disclosed herein implement a quantum failsafe service that preserves the state of a quantum service and/or qubits in use by the quantum service in the event that the quantum computing device executing the quantum service encounters operating conditions that threaten its stability or availability. In this manner, the quantum service may be efficiently restored and restarted when the availability of quantum computing device is stabilized or restored.

In one example, a method for providing a quantum failsafe service is disclosed. The method comprises receiving, by a first quantum failsafe service (QFS) of a first quantum computing device, a system stress indicator for the first quantum computing device from a system monitor. The method further comprises determining, based on the system stress indicator, that a quantum service backup is to be performed for a quantum service running on the first quantum computing device. The method also comprises obtaining, by the first QFS, a profile snapshot for the quantum service. The method additionally comprises performing, by the first QFS, superdense encoding of the profile snapshot using one or more first qubits that are each in an entangled state with a corresponding one or more second qubits of a second quantum computing device. The method further comprises sending the one or more first qubits to the second quantum computing device.

In another example, a first quantum computing device for providing a quantum failsafe service is disclosed. The first quantum computing device comprises a first system memory, and a first processor device coupled to the first system memory. The first processor device is to receive, using a first QFS, a system stress indicator for the first quantum computing device from a system monitor. The first processor device is further to determine, based on the system stress indicator, that a quantum service backup is to be performed for a quantum service running on the first quantum computing device. The first processor device is also to obtain, using the first QFS, a profile snapshot for the quantum service. The first processor device is additionally to perform, using the first QFS, superdense encoding of the profile snapshot using one or more first qubits that are each in an entangled state with a corresponding one or more second qubits of a second quantum computing device. The first processor device is further to send the one or more first qubits to the second quantum computing device.

In another example, a computer program product is provided. The computer program product comprises a non-transitory computer-readable medium having stored thereon computer-executable instructions which, when executed, cause one or more processor devices to receive a system stress indicator for a first quantum computing device from a system monitor. The computer-executable instructions further cause the one or more processor devices to determine, based on the system stress indicator, that a quantum service backup is to be performed for a quantum service running on the first quantum computing device. The computer-executable instructions also cause the one or more processor devices to obtain a profile snapshot for the quantum service. The computer-executable instructions additionally cause the one or more processor devices to perform superdense encoding of the profile snapshot using one or more first qubits that are each in an entangled state with a corresponding one or more second qubits of a second quantum computing device. The computer-executable instructions further cause the one or more processor devices to send the one or more first qubits to the second quantum computing device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first quantum computing device" and "second quantum computing device," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As discussed above, quantum computing involves the use of quantum bits, referred to herein as "qubits," which have characteristics that differ from those of classical (i.e., non-quantum) bits used in classical computing. For example, while a classical bit may be in a state of either one (1) or zero (0), a qubit may be in a "superposition" of both states simultaneously. A pair of qubits may also experience a physical phenomenon referred to as "entanglement," in which the quantum state of each qubit cannot be described independently of the state of the other qubit. Classical computing has no corollaries to superposition and entanglement.

The phenomenon of entanglement underlies a quantum communication protocol known as "superdense encoding," which allows two classical bits of information to be transmitted from a sender to a recipient by sending only one qubit from the sender to the recipient. To use superdense encoding, the sender and the recipient each must first be in possession of one qubit of a pair of entangled qubits. The sender can then encode two classical bits of information by manipulating the sender's entangled qubit (i.e., by performing a quantum gate operation such as a bit flip operation and/or a phase flip operation, as non-limiting examples), which allows the sender to prearrange the result of the recipient's measurement of the pair of entangled qubits. After the sender sends the entangled qubit to the recipient, the recipient can then perform measurements on the pair of entangled qubits to decode the two classical bits of information. Superdense encoding can be leveraged to decrease the number of data bits transmitted via a communications network by half, and as a result may offer benefits in terms of network optimization and bandwidth management, particularly when designing cloud-based service architectures.

Quantum computing devices generally have stricter requirements in terms of their operating environment than classical (i.e., non-quantum) computing devices. For instance, the operating environment of a quantum computing device may require that a specific temperature range be maintained to ensure coherence of qubits used for quantum operations. Thus, as quantum computing continues to increase in popularity and become more commonplace, an ability to proactively respond to adverse operating conditions that may jeopardize the availability of a quantum service, and to facilitate restoration of the quantum service when favorable operating conditions are restored, will be desirable.

The examples disclosed herein implement a quantum failsafe service (QFS) that uses superdense encoding to transmit a profile snapshot of a quantum service for backup in a classical data store in response to a deterioration of operating conditions of a quantum computing device running the quantum service. As used herein, the term "quantum service" and derivatives thereof refer to a process that executes on a quantum computing device, and that accesses one or more qubits to provide a desired functionality. To provide quantum failsafe functionality, a QFS executing on a first quantum computing device receives a system stress indicator from a system monitor that tracks a status of the first quantum computing device and/or a status of qubits maintained by the first quantum computing device. The system stress indicator may include, as non-limiting examples, an indication of a state of the first quantum computing device itself (e.g., system load, system response time, operating temperature, and/or the like), an indication of a state of the qubits maintained by the first quantum computing device (e.g., qubit age, coherence time, and/or the like), and/or an indication of any other condition that may adversely affect the ability of the first quantum computing device to maintain its qubits in a usable state.

The QFS determines, based on the system stress indicator, that a quantum service backup is to be performed for a quantum service that is running on the first quantum computing device. As a non-limiting example, the QFS may make the determination by employing a rules engine that provides rules for comparing the system stress indicator with a corresponding operating threshold or parameter. Thus, for instance, the system stress indicator may comprise a current operating temperature of the quantum computing device, which may be compared to a rule that specifies an acceptable operating temperature for the quantum computing device to determine whether the current operating temperature exceeds the acceptable operating temperature.

Upon determining that a quantum service backup is to be performed for the quantum service running on the first quantum computing device, the QFS obtains a profile snapshot for the quantum service. The profile snapshot in some examples is provided by the quantum service, and includes data that represents a current state of the quantum service and that can be used to later restore the quantum service to its current state. As non-limiting examples, the profile snapshot may include an identifier of the quantum service, an internal state of the quantum service, a memory usage indicator indicating current memory usage of the quantum service, a processor usage indicator indicating current processor usage of the quantum service, and/or a Quantum Assembly Language (QASM) file identifier for a QASM file that defines the quantum service. The profile snapshot may also include data, obtained from a qubit registry, that represents qubits used by the quantum service, such as one or more qubit identifiers and/or one or more qubit data values, as non-limiting examples.

The QFS then performs superdense encoding of the profile snapshot using a first set of qubits that are entangled with a second set of qubits of a second quantum computing device. The first set of qubits are sent to the second quantum computing device, using, as a non-limiting example, a quantum channel between the first quantum computing device and the second quantum computing device. In some examples, the second quantum computing device receives the first set of qubits using its own QFS, performs superdense decoding of the profile snapshot using the first and second sets of qubits, and stores the profile snapshot in a classical data repository (e.g., a database or a file system on a persistent data store, as non-limiting examples). In this manner, a current state of a quantum service running on the first quantum computing device may be captured and stored for use in later restoring the quantum service.

Some examples may provide that the second QFS may later determine that the first quantum computing device is operational, retrieve the profile snapshot from the classical data repository, and transmit the profile snapshot to the first quantum computing device. The first quantum computing device may then use the profile snapshot to restore and restart the quantum service.

Figure 1:
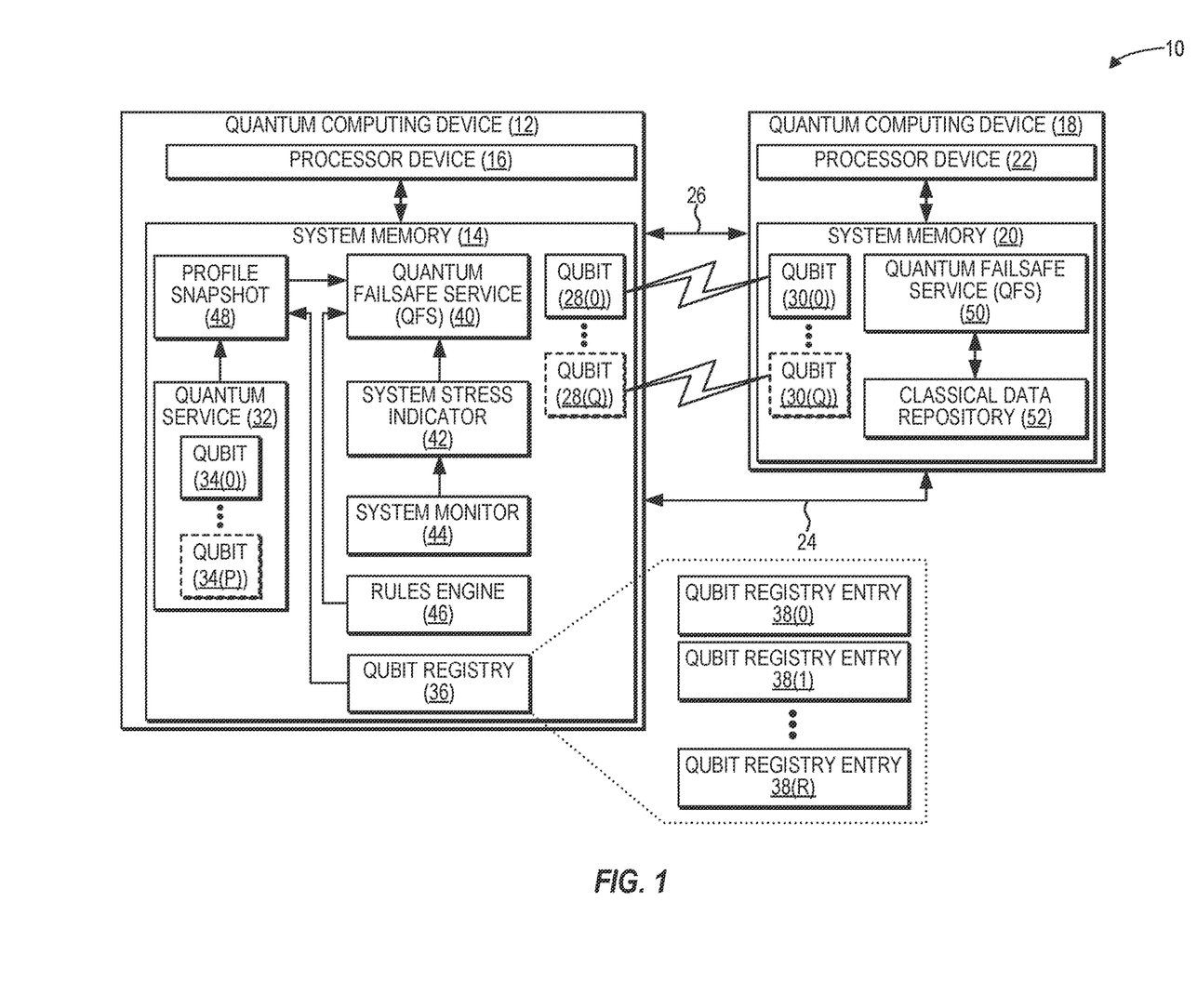
FIG. 1 is a block diagram of a quantum computing system in which examples may be practiced.

FIG. 1 is a block diagram of a quantum computing system 10 according to one example. The quantum computing system 10 includes a first quantum computing device 12 that comprises a first system memory 14 and a first processor device 16, and also includes a second quantum computing device 18 that comprises a second system memory 20 and a second processor device 22. The first quantum computing device 12 and the second quantum computing device 18 in FIG. 1 are communicatively coupled via a classical communications link 24, which may comprise a private network or a public network such as the internet. In additional, the first quantum computing device 12 and the second quantum computing device 18 are communicatively coupled via a quantum channel 26, which may comprise any communications channel over which qubits may be sent (such as, e.g., fiber optic cabling or pulsed lasers, as non-limiting examples). It is to be understood that the quantum computing system 10 according to some examples may include other classical computing devices and/or quantum computing devices that are not illustrated in FIG. 1. Additionally, the first quantum computing device 12 and the second quantum computing device 18 in some examples may include constituent elements in addition to those illustrated in FIG. 1.

The first quantum computing device 12 and the second quantum computing device 18 in the example of FIG. 1 may be close in physical proximity to one another or may be relatively long distances from one another. The first quantum computing device 12 and the second quantum computing device 18 operate in quantum environments but can operate using classical computing principles or quantum computing principles. When using quantum computing principles, the first quantum computing device 12 and the second quantum computing device 18 perform computations that utilize quantum-mechanical phenomena, such as superposition and/or entanglement states. The first quantum computing device 12 and the second quantum computing device 18 each may operate under certain environmental conditions, such as at or near zero degrees (0°) Kelvin. When using classical computing principles, the first quantum computing device 12 and the second quantum computing device 18 utilize binary digits that have a value of either zero (0) or one (1).

In the example of FIG. 1, the first quantum computing device 12 maintains a set of one or more first qubits 28(0)-28(Q), which are in a state of entanglement with a set of one or more second qubits 30(0)-30(Q) that are maintained by the second quantum computing device 18. According to some examples, prior to the quantum computing system 10 performing operations using the entangled first qubits 28(0)-28(Q) and second qubits 30(0)-30(Q), the first quantum computing device 12 may induce an entangled state between each qubit of the one or more first qubits 28(0)-28(Q) and a corresponding qubit of the one or more second qubits 30(0)-30(Q), and then send the one or more second qubits 30(0)-30(Q) to the second quantum computing device 18 (e.g., via the quantum channel 26). Inducing the entangled state between the one or more first qubits 28(0)-28(Q) and the one or more second qubits 30(0)-30(Q) may be performed, e.g., using Quantum Assembly (QASM) files to apply a Hadamard gate to each of the one or more first qubits 28(0)-28(Q) to place them a state of superposition, and then apply a CNOT gate to each of the one or more second qubits 30(0)-30(Q), as a non-limiting example.

The first quantum computing device 12 of FIG. 1 executes a quantum service 32 that employs one or more third qubits 34(0)-34(P) that are also maintained by the first quantum computing device 12. To maintain information for qubits such as the first qubit(s) 28(0)-28(Q) and the third qubit(s) 34(0)-34(P), the first quantum computing device 12 includes a qubit registry 36, which comprises a plurality of qubit registry entries 38(0)-38(R) each corresponding to a qubit such as the first qubit(s) 28(0)-28(Q) and the third qubit(s) 34(0)-34(P). The qubit registry 36, in some examples, stores data relating to the qubits implemented by the first quantum computing device 12, such as a count of the total number of qubits implemented by the first quantum computing device 12 and a count of the number of available qubits that are currently available for allocation, as non-limiting examples. Each of the qubit registry entries 38(0)-38(R) also stores qubit metadata (not shown) for a corresponding qubit. The qubit metadata may include, as non-limiting examples, an identifier of the corresponding qubit, an availability indicator that indicates whether the corresponding qubit is available for use or is in use by a specific quantum process, an identifier of a quantum process associated with the corresponding qubit, and/or an entanglement indicator that indicates whether the corresponding qubit is in an entangled state.

As discussed above, it is desirable for the first quantum computing device 12 to be able to proactively respond to adverse operating conditions that may jeopardize the availability of quantum services such as the quantum service 32, and to facilitate restoration of the quantum service 32 when favorable operating conditions are restored. For instance, in one possible use case, an organization making use of the quantum computing device 12 may seek to deploy quantum failsafe functionality as part of a disaster recovery plan. Accordingly, in the example of FIG. 1, the first quantum computing device 12 implements a first QFS 40 that provides quantum failsafe functionality. The first QFS 40 is executed by the first processor device 16 and receives a system stress indicator 42 from a system monitor 44 of the first quantum computing device 12. The system monitor 44 tracks a status of the first quantum computing device 12 and/or a status of the first qubit(s) 28(0)-28(Q) and the third qubit(s) 34(0)-34(P) maintained by the first quantum computing device 12. In some examples, the system monitor 44 comprises a process executed by the first processor device 16, while some examples may provide that the system monitor 44 represents a sensor or other hardware that provides data to the first processor device 16. It is to be understood that, while the system monitor 44 is illustrated in FIG. 1 as an integral element of the first quantum computing device 12, some examples may provide the system monitor 44 as an element separate from and/or external to the first quantum computing device 12.

The system stress indicator 42 may comprise an indication of any operating or environmental condition that may affect the ability of the first quantum computing device 12 to maintain the first qubit(s) 28(0)-28(Q) and the third qubit(s) 34(0)-34(P) in a usable state. Thus, according to some examples, the system stress indicator 42 may include an indication of a state of the first quantum computing device 12 itself, such as a system load indication, a system response time indication, an operating temperature indication, and/or the like, as non-limiting examples. Some examples may provide that the system stress indicator 42 comprises an indication of a state of the first qubit(s) 28(0)-28(Q) and the third qubit(s) 34(0)-34(P) maintained by the first quantum computing device 12, such as a qubit age indication, a coherence time indication, and/or the like, as non-limiting examples.

Upon receiving the system stress indicator 42, the first QFS 40 determines, based on the system stress indicator 42, whether a quantum service backup is to be performed for the quantum service 32 running on the first quantum computing device 12. In some examples, the first QFS 40 may determine whether a quantum service backup is to be performed by using a rules engine 46 to compare the system stress indicator 42 to a rule (not shown) specifying a predetermined threshold or parameter. For instance, a rule provided by the rules engine 46 may indicate an operating threshold for the first quantum computing device 12, and the first QFS 40, upon receiving a temperature reading provided by the system stress indicator 42, may use the rule to determine that a current operating temperature of the first quantum computing device 12 exceeds the maximum temperature threshold.

After determining that a quantum service backup is to be performed, the first QFS 40 obtains a profile snapshot 48 for the quantum service 32. The profile snapshot 48, in some examples, may include data obtained from the quantum service 32 and/or from the qubit registry 36 and represents a current state of the quantum service 32 for use in later restoring the quantum service 32. As non-limiting examples, the profile snapshot 48 may include an identifier of the quantum service 32, an internal state of the quantum service 32, a memory usage indicator indicating current memory usage of the quantum service 32, a processor usage indicator indicating current processor usage of the quantum service 32, and/or a Quantum Assembly Language (QASM) file identifier for a QASM file (not shown) that defines the quantum service 32. The profile snapshot 48 may also include data obtained from the qubit registry 36 that represents the one or more third qubits 34(0)-34(P), such as one or more qubit identifiers and/or one or more qubit data values, as non-limiting examples.

The first QFS 40 then perform superdense encoding of the profile snapshot 48 using the one or more first qubits 28(0)-28(Q) that are entangled with the one or more second qubits 30(0)-30(Q) of the second quantum computing device 18. Some examples may provide that the first QFS 40 may perform superdense encoding by first dividing the profile snapshot 48 into one or more compressible elements (not shown) of two (2) classical bits each, with each of the compressible elements corresponding to one of the first qubits 28(0)-28(Q) used to perform the superdense encoding. Superdense encoding is then performed for each compressible element of the one or more compressible elements by, for example, transforming a Bell state of a corresponding qubit of the one or more first qubits 28(0)-28(Q). After performing superdense encoding, the first QFS 40 sends the one or more first qubits 28(0)-28(Q) to the second quantum computing device 18 (e.g., via the quantum channel 26).

According to some examples, when a second QFS 50 of the second quantum computing device 18 receives the one or more first qubits 28(0)-28(Q) from the first quantum computing device 12, the second QFS 50 performs superdense decoding of the one or more first qubits 28(0)-28(Q) and the one or more second qubits 30(0)-30(Q) to obtain the profile snapshot 48. The second QFS 50 then stores the profile snapshot 48 in a classical data repository 52. The classical data repository 52, in some examples, may comprise a conventional classical database or a file system on a conventional classical persistent data store such as a hard drive, as non-limiting examples. Subsequently, according to some examples, the second QFS 50 may determine that the first quantum computing device 12 is operational (e.g., due to the operational environment of the first quantum computing device 12 returning to acceptable conditions, or due to the first quantum computing device 12 being restarted). The second QFS 50 may then retrieve the profile snapshot 48 from the classical data repository 52 and transmit the profile snapshot 48 to the first quantum computing device 12.

Upon receiving the profile snapshot 48, the first quantum computing device 12, according to some examples, may restore the quantum service 32 based on the profile snapshot 48. For instance, the first quantum computing device 12 may use the data in the profile snapshot 48 to restore a state of each qubit of the one or more third qubits 34(0)-34(P) of the quantum service 32 and may further use the data in the profile snapshot 48 to recreate the state of the quantum service 32 at the time the profile snapshot 48 was obtained. The first quantum computing device 12 may then restart the quantum service 32.

It is to be understood that, because the first QFS 40 is a component of the first quantum computing device 12, functionality implemented by the first QFS 40 may be attributed to the quantum computing system 10 generally. Moreover, in examples where the first QFS 40 comprises software instructions that program the first processor device 16 to carry out functionality discussed herein, functionality implemented by the first QFS 40 may be attributed herein to the first processor device 16. It is to be further understood that while, for purposes of illustration only, the first QFS 40 is depicted as a single component, the functionality implemented by the first QFS 40 may be implemented in any number of components, and the examples discussed herein are not limited to any particular number of components.

Figure 2A:
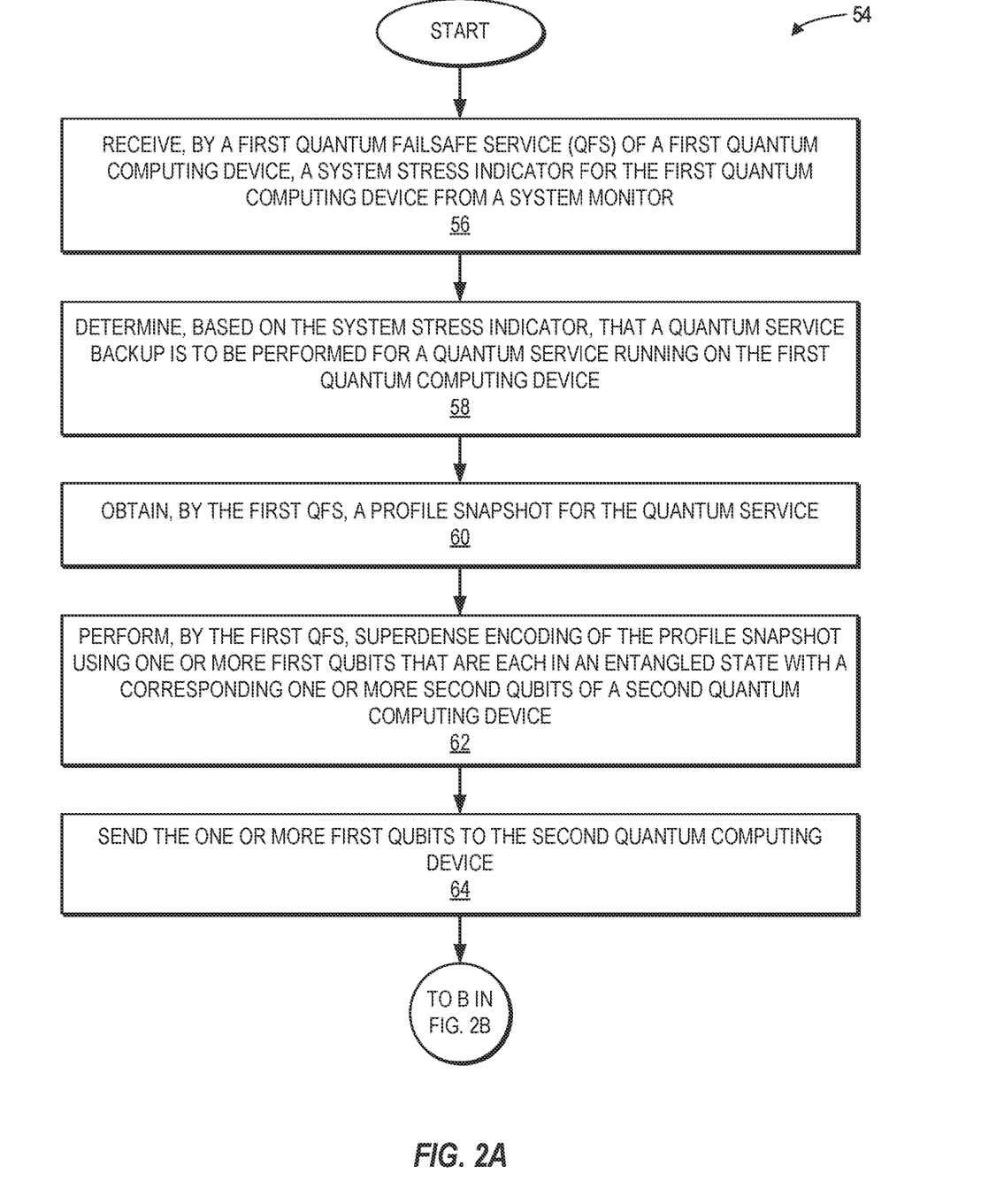
FIGS. 2A-2C are flowcharts illustrating operations performed by a sending quantum computing device for providing a quantum failsafe service, according to one example.
Figure 2B:
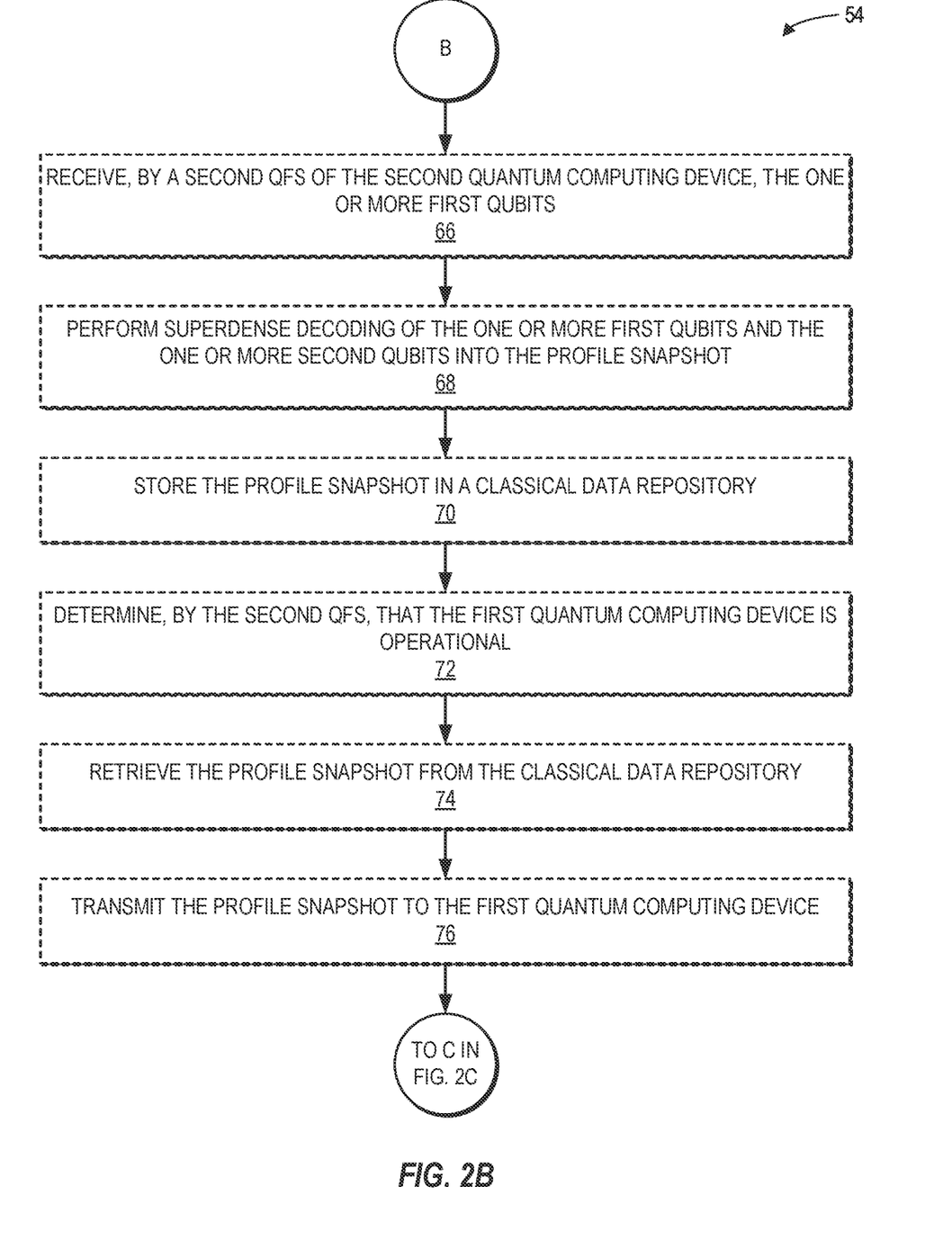
Figure 2C:
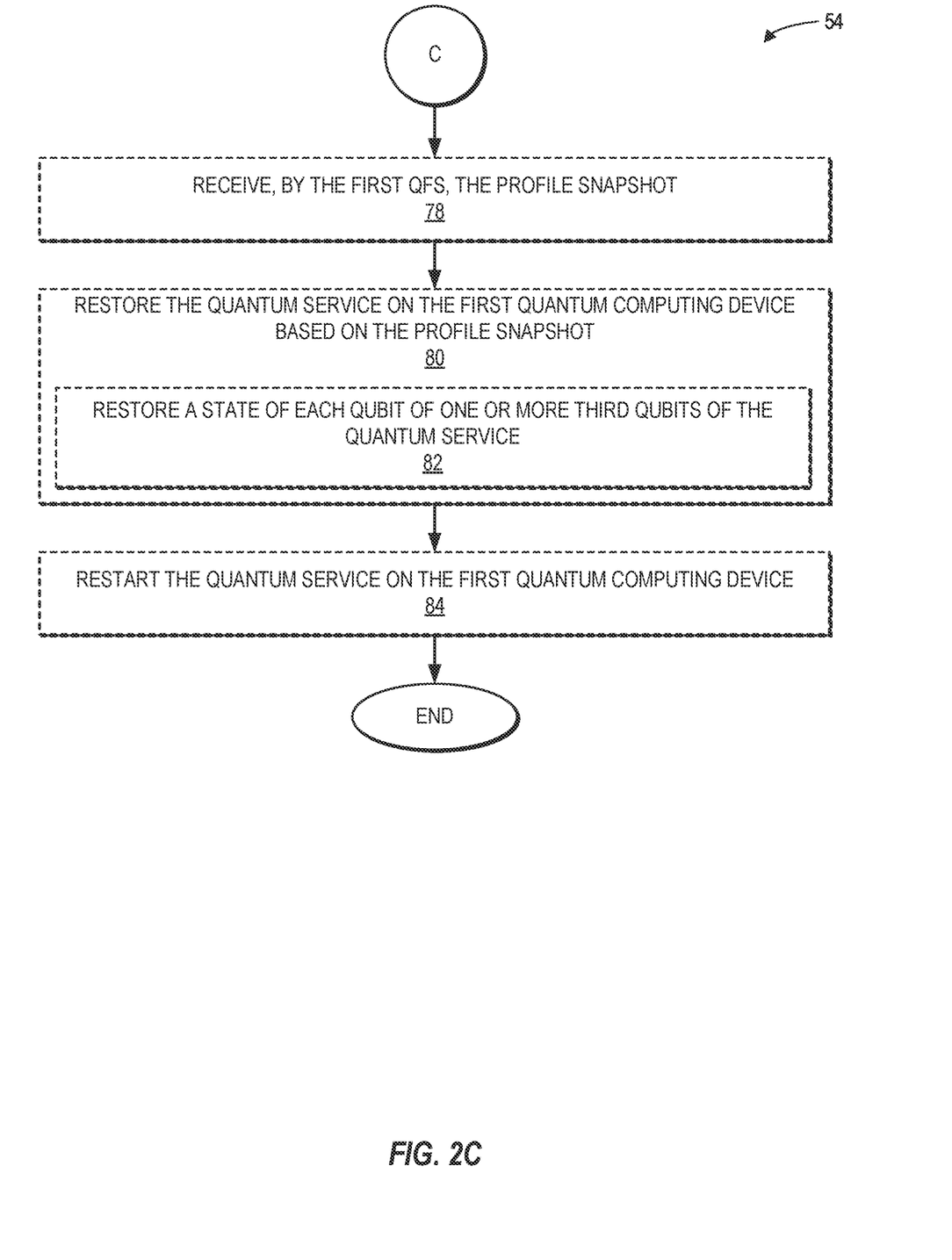

To illustrate exemplary operations performed by the quantum computing system 10 of FIG. 1 for providing a quantum failsafe service according to one example, FIGS. 2A-2C provide a flowchart 54. Elements of FIG. 1 are referenced in describing FIGS. 2A-2C for the sake of clarity. In FIG. 2A, operations begin with the first processor device 16 of the first quantum computing device 12 receiving (e.g., by executing the first QFS 40) the system stress indicator 42 for the first quantum computing device 12 from the system monitor 44 (block 56). The first QFS 40 determines, based on the system stress indicator 42, that a quantum service backup is to be performed for the quantum service 32 running on the first quantum computing device 12 (block 58).

The first QFS 40 obtains the profile snapshot 48 for the quantum service 32 (block 60). The first QFS 40 next performs superdense encoding of the profile snapshot 48 using one or more first qubits 28(0)-28(Q) that are each in an entangled state with a corresponding one or more second qubits 30(0)-30(Q) of a second quantum computing device 18 (block 62). The first QFS 40 then sends the one or more first qubits 28(0)-28(Q) to the second quantum computing device 18 (block 64). Operations in some examples then continue at block 66 of FIG. 2B.

Turning now to FIG. 2B, in some examples, the second processor device 22 of the second quantum computing device 18 receives (e.g., by executing the second QFS 50) the one or more first qubits 28(0)-28(Q) (block 66). The second QFS 50 next performs superdense decoding of the one or more first qubits 28(0)-28(Q) and the one or more second qubits 30(0)-30(Q) into the profile snapshot 48 (block 68). The second QFS 50 then stores the profile snapshot 48 in the classical data repository 52 (block 70). Subsequently, the second QFS 50 determines the first quantum computing device 12 is operational (e.g., after the operation conditions of the first quantum computing device 12 have stabilized and/or the first quantum computing device 12 has been restarted, as non-limiting examples) (block 72). In response, the second QFS 50 retrieves the profile snapshot 48 from the classical data repository 52 (block 74). The second QFS 50 then transmits the profile snapshot 48 to the first quantum computing device 12 (block 76). Operations according to some examples then continue at block 78 of FIG. 2C.

Referring now to FIG. 2C, the first QFS 40 in some examples receives the profile snapshot 48 (block 78). The first QFS 40 then restores the quantum service 32 on the first quantum computing device 12 based on the profile snapshot 48 (block 80). In some examples, the operations of block 80 for restoring the quantum service 32 on the first quantum computing device 12 based on the profile snapshot 48 comprises restoring a state of each qubit of the one or more third qubits 34(0)-34(P) of the quantum service 32 (block 82). Finally, the first QFS 40 restarts the quantum service 32 on the first quantum computing device 12 (block 84).

Figure 3:
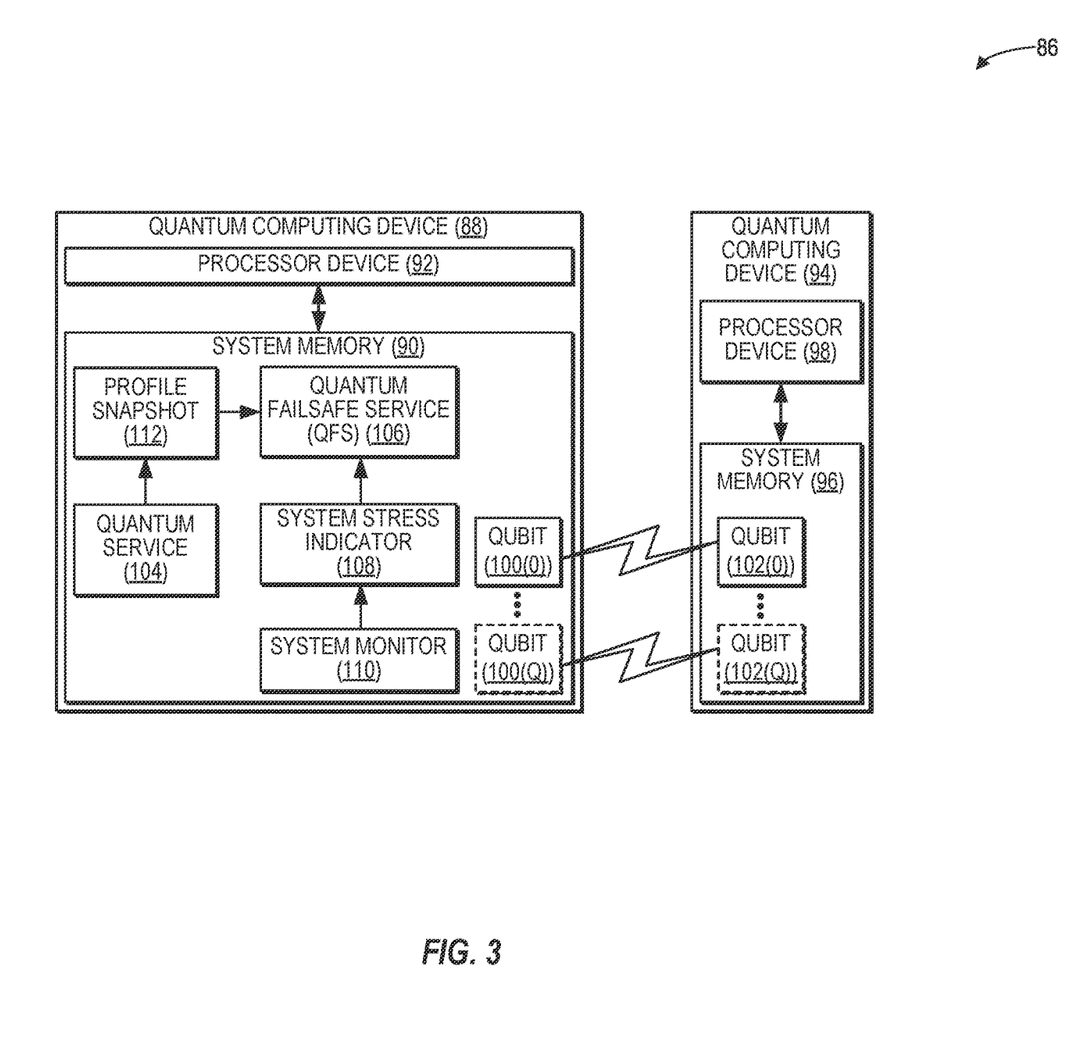
FIG. 3 is a simpler block diagram of the quantum computing device of FIG. 1 for providing a quantum failsafe service, according to one example.

FIG. 3 is a simpler block diagram of the quantum computing system 10 of FIG. 1 for providing a quantum failsafe service, according to one example. In the example of FIG. 3, a quantum computing system 86 includes a first quantum computing device 88 that comprises a first system memory 90 and a first processor device 92, and also includes a second quantum computing device 94 that comprises a second system memory 96 and a second processor device 98. The first quantum computing device 88 maintains a set of one or more first qubits 100(0)-100(Q), which are in a state of entanglement with a set of one or more second qubits 102(0)-102(Q) that are maintained by the second quantum computing device 94. The first quantum computing device 88 of FIG. 3 executes a quantum service 104.

The first quantum computing device 88 implements a first QFS 106 that provides quantum failsafe functionality. The first QFS 106 is executed by the first processor device 92 and receives a system stress indicator 108 from a system monitor 110 of the first quantum computing device 88. The system monitor 110 tracks a status of the first quantum computing device 88 and/or a status of qubits maintained by the first quantum computing device 88. Upon receiving the system stress indicator 108, the first QFS 106 determines, based on the system stress indicator 108, whether a quantum service backup is to be performed for the quantum service 104 running on the first quantum computing device 88.

After determining that a quantum service backup is to be performed, the first QFS 106 obtains a profile snapshot 112 for the quantum service 104. The first QFS 106 then perform superdense encoding of the profile snapshot 112 using the one or more first qubits 100(0)-100(Q) that are entangled with the one or more second qubits 102(0)-102(Q) of the second quantum computing device 94. The first QFS 106 then sends the one or more first qubits 100(0)-100(Q) to the second quantum computing device 94.

Figure 4:
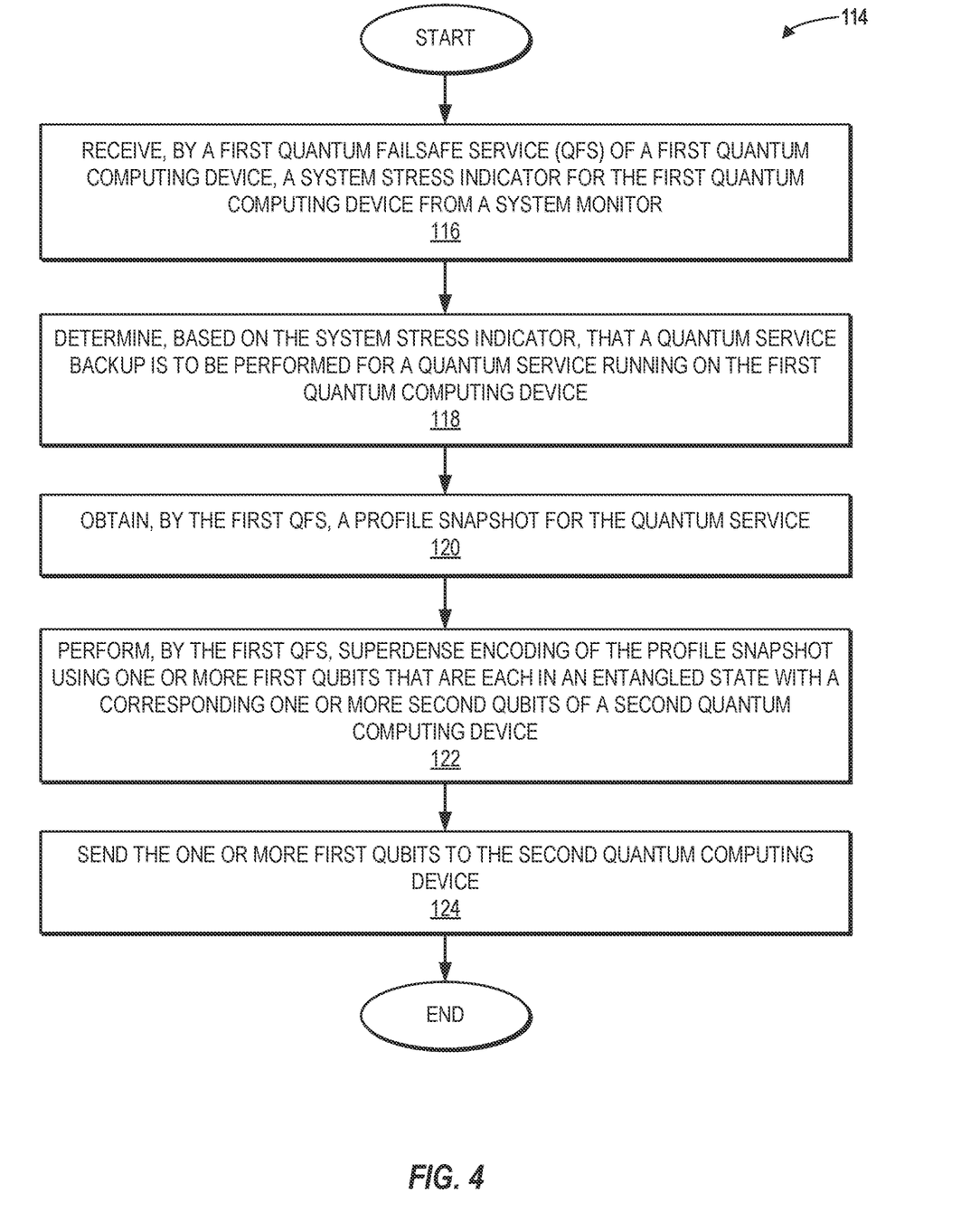
FIG. 4 is a flowchart of a simplified method for providing a quantum failsafe service in the quantum computing device of FIG. 3, according to one example.

FIG. 4 provides a flowchart 114 of a simplified method for providing a quantum failsafe service in the quantum computing system 86 of FIG. 3, according to one example. For the sake of clarity, elements of FIG. 3 are referenced in describing FIG. 4. Operations in FIG. 4 begin with the first processor device 92 of the first quantum computing device 88 receiving (e.g., by executing the first QFS 106) the system stress indicator 108 for the first quantum computing device 88 from the system monitor 110 (block 116). The first QFS 106 determines, based on the system stress indicator 108, that a quantum service backup is to be performed for the quantum service 104 running on the first quantum computing device 88 (block 118).

The first QFS 106 obtains the profile snapshot 112 for the quantum service 104 (block 120). The first QFS 106 next performs superdense encoding of the profile snapshot 112 using one or more first qubits 100(0)-100(Q) that are each in an entangled state with a corresponding one or more second qubits 102(0)-102(Q) of a second quantum computing device 94 (block 122). The first QFS 106 then sends the one or more first qubits 100(0)-100(Q) to the second quantum computing device 94 (block 124).

Figure 5:
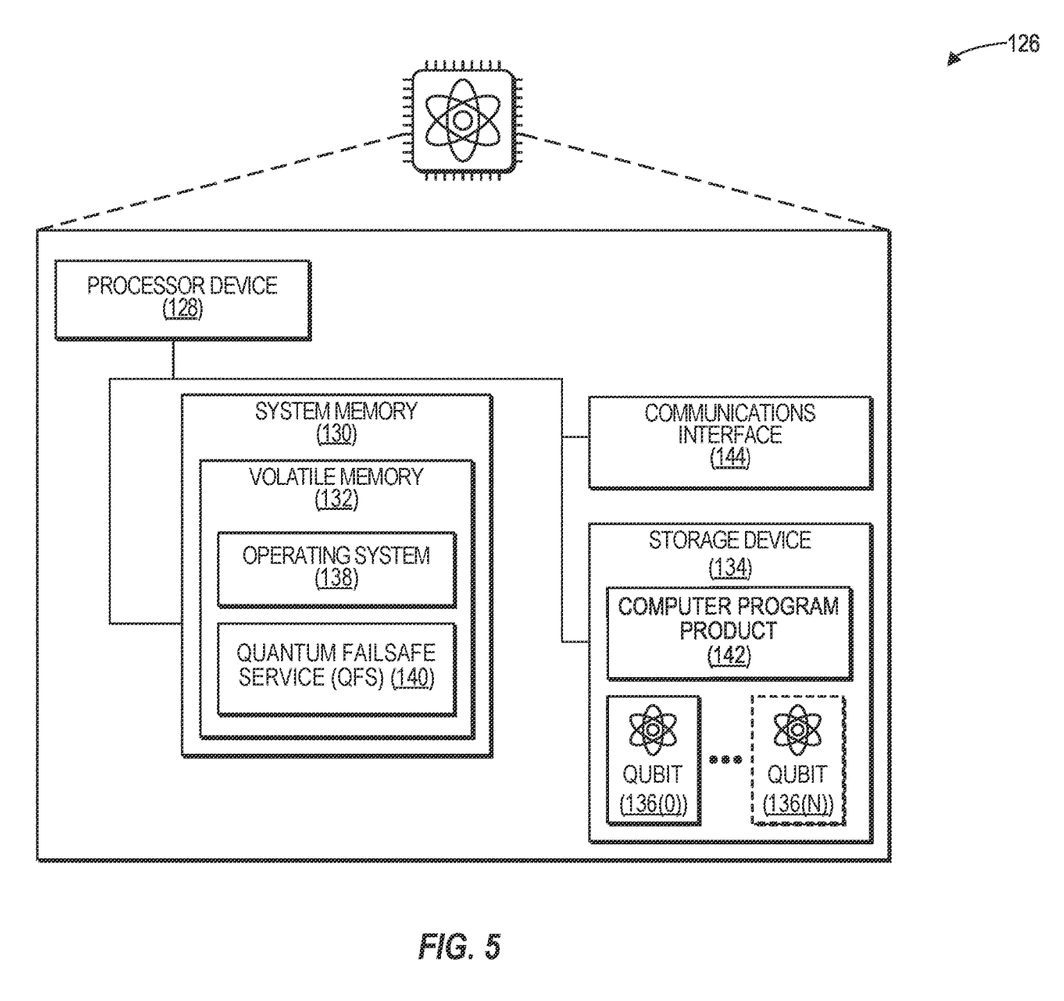
FIG. 5 is a block diagram of a quantum computing device suitable for implementing examples, according to one example.

FIG. 5 is a block diagram of a quantum computing device 126, such as the first quantum computing device 12 and the second quantum computing device 18 of FIG. 1, suitable for implementing examples according to one example. The quantum computing device 126 may comprise any suitable quantum computing device or devices. The quantum computing device 126 can operate using classical computing principles or quantum computing principles. When using quantum computing principles, the quantum computing device 126 performs computations that utilize quantum-mechanical phenomena, such as superposition and entanglement. The quantum computing device 126 may operate under certain environmental conditions, such as at or near zero degrees (0°) Kelvin. When using classical computing principles, the quantum computing device 126 utilizes binary digits that have a value of either zero (0) or one (1).

The quantum computing device 126 includes a processor device 128 and a system memory 130. The processor device 128 can be any commercially available or proprietary processor suitable for operating in a quantum environment. The system memory 130 may include volatile memory 132 (e.g., random-access memory (RAM)). The quantum computing device 126 may further include or be coupled to a non-transitory computer-readable storage medium such as a storage device 134. The storage device 134 and other drives associated with computer-readable media and computer-usable media may provide non-volatile storage of data, data structures, computer-executable instructions, and the like. The storage device may also provide functionality for storing one or more qubits 136(0)-136(N).

A number of modules can be stored in the storage device 134 and in the volatile memory 132, including an operating system 138 and one or more modules, such as a QFS 140. All or a portion of the examples may be implemented as a computer program product 142 stored on a transitory or non-transitory computer-usable or computer-readable storage medium, such as the storage device 134, which includes complex programming instructions, such as complex computer-readable program code, to cause the processor device 128 to carry out the steps described herein. Thus, the computer-readable program code can comprise computer-executable instructions for implementing the functionality of the examples described herein when executed on the processor device 128.

An operator may also be able to enter one or more configuration commands through a keyboard (not illustrated), a pointing device such as a mouse (not illustrated), or a touch-sensitive surface such as a display device (not illustrated). The quantum computing device 126 may also include a communications interface 144 suitable for communicating with other quantum computing systems, including, in some implementations, classical computing devices.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a first quantum failsafe service (QFS) of a first quantum computing device, a system stress indicator for the first quantum computing device from a system monitor;

determining, based on the system stress indicator, that a quantum service backup is to be performed for a quantum service running on the first quantum computing device;

obtaining, by the first QFS, a profile snapshot for the quantum service;

performing, by the first QFS, superdense encoding of the profile snapshot using one or more first qubits that are each in an entangled state with a corresponding one or more second qubits of a second quantum computing device; and sending the one or more first qubits to the second quantum computing device.

2. The method of claim 1, wherein the system stress indicator comprises one or more of an indication of a state of the quantum computing device and an indication of a state of one or more third qubits of the quantum service.

3. The method of claim 2, wherein:
the indication of the state of the quantum computing device comprises one or more of an indication of system load, an indication of system response time, and an indication of operating temperature; and
the indication of the state of the one or more third qubits of the quantum service comprises one or more of an indication of qubit age and an indication of coherence time.

4. The method of claim 1, wherein the profile snapshot comprises one or more of an identifier of the quantum service, an internal state of the quantum service, a memory usage indicator that indicates memory usage of the quantum service, a processor usage indicator that indicates processor usage of the quantum service, a Quantum Assembly Language (QASM) file identifier for a QASM file that defines the quantum service, one or more qubit identifiers corresponding to one or more third qubits of the quantum service, and one or more qubit data values corresponding to the one or more third qubits.

5. The method of claim 1, further comprising:
receiving, by a second QFS of the second quantum computing device, the one or more first qubits;
performing superdense decoding of the one or more first qubits and the one or more second qubits into the profile snapshot; and
storing the profile snapshot in a classical data repository.

6. The method of claim 5, further comprising:
determining, by the second QFS, that the first quantum computing device is operational;
retrieving the profile snapshot from the classical data repository; and
transmitting the profile snapshot to the first quantum computing device.

7. The method of claim 6, further comprising:
receiving, by the first QFS, the profile snapshot;
restoring the quantum service on the first quantum computing device based on the profile snapshot; and
restarting the quantum service on the first quantum computing device.

8. The method of claim 7, wherein restoring the quantum service on the first quantum computing device based on the profile snapshot comprises restoring a state of each qubit of one or more third qubits of the quantum service.

9. A computing system, comprising:
a first quantum computing device, comprising:
a first system memory; and
a first processor device coupled to the first system memory, the first processor device to:
receive, using a first quantum failsafe service (QFS), a system stress indicator for the first quantum computing device from a system monitor;
determine, based on the system stress indicator, that a quantum service backup is to be performed for a quantum service running on the first quantum computing device;
obtain, using the first QFS, a profile snapshot for the quantum service;
perform, using the first QFS, superdense encoding of the profile snapshot using one or more first qubits that are each in an entangled state with a corresponding one or more second qubits of a second quantum computing device; and
send the one or more first qubits to the second quantum computing device.

10. The computing system of claim 9, wherein the system stress indicator comprises one or more of an indication of a state of the quantum computing device and an indication of a state of one or more third qubits of the quantum service.

11. The computing system of claim 10, wherein:
the indication of the state of the quantum computing device comprises one or more of an indication of system load, an indication of system response time, and an indication of operating temperature; and
the indication of the state of the one or more third qubits of the quantum service comprises one or more of an indication of qubit age and an indication of coherence time.

12. The computing system of claim 9, wherein the profile snapshot comprises one or more of an identifier of the quantum service, an internal state of the quantum service, a memory usage indicator that indicates memory usage of the quantum service, a processor usage indicator that indicates processor usage of the quantum service, a Quantum Assembly Language (QASM) file identifier for a QASM file that defines the quantum service, one or more qubit identifiers corresponding to one or more third qubits of the quantum service, and one or more qubit data values corresponding to the one or more third qubits.

13. The computing system of claim 9, wherein the second quantum computing device comprises:
a second system memory; and
a second processor device coupled to the second system memory, the second processor device to:
receive, using a second QFS of the second quantum computing device, the one or more first qubits;
perform superdense decoding of the one or more first qubits and the one or more second qubits into the profile snapshot; and
store the profile snapshot in a classical data repository.

14. The computing system of claim 13, wherein the second processor device is further to:
determine, using the second QFS, that the first quantum computing device is operational;
retrieve the profile snapshot from the classical data repository; and
transmit the profile snapshot to the first quantum computing device.

15. The computing system of claim 14, wherein the first processor device is further to:
receive, by the first QFS, the profile snapshot;
restore the quantum service on the first quantum computing device based on the profile snapshot; and
restart the quantum service on the first quantum computing device.

16. The computing system of claim 15, wherein to restore the quantum service on the first quantum computing device based on the profile snapshot is to restore a state of each qubit of one or more third qubits of the quantum service.

17. A non-transitory computer-readable storage medium having stored thereon computer-executable instructions that, when executed, cause one or more processor devices to:
- receive a system stress indicator for a first quantum computing device from a system monitor;
- determine, based on the system stress indicator, that a quantum service backup is to be performed for a quantum service running on the first quantum computing device;
- obtain a profile snapshot for the quantum service;
- perform superdense encoding of the profile snapshot using one or more first qubits that are each in an entangled state with a corresponding one or more second qubits of a second quantum computing device; and
- send the one or more first qubits to the second quantum computing device.

18. The non-transitory computer-readable medium of claim 17, wherein the computer-executable instructions further cause the one or more processor devices to:
- receive the one or more first qubits;
- perform superdense decoding of the one or more first qubits and the one or more second qubits into the profile snapshot; and
- store the profile snapshot in a classical data repository.

19. The non-transitory computer-readable medium of claim 18, wherein the computer-executable instructions further cause the one or more processor devices to:
- determine that the first quantum computing device is operational;
- retrieve the profile snapshot from the classical data repository; and
- transmit the profile snapshot to the first quantum computing device.

20. The non-transitory computer-readable medium of claim 19, wherein the computer-executable instructions further cause the one or more processor devices to:
- receive the profile snapshot;
- restore the quantum service on the first quantum computing device based on the profile snapshot; and
- restart the quantum service on the first quantum computing device.

* * * * *